US011269759B2

(12) United States Patent
Deshpande et al.

(10) Patent No.: US 11,269,759 B2
(45) Date of Patent: Mar. 8, 2022

(54) INTELLIGENT REGRESSION FORTIFIER

(71) Applicant: SAP SE, Walldorf (DE)

(72) Inventors: Ashwini Deshpande, Bangalore (IN); Hariprasaad Sabapathy, Tamil Nadu (IN); Prasanna Bhat Mavinakuli, Tq. (IN)

(73) Assignee: SAP SE, Walldorf (DE)

( * ) Notice: Subject to any disclaimer, the term of this patent is extended or adjusted under 35 U.S.C. 154(b) by 233 days.

(21) Appl. No.: 16/191,981

(22) Filed: Nov. 15, 2018

(65) Prior Publication Data

US 2020/0159650 A1 May 21, 2020

(51) Int. Cl.
*G06F 11/36* (2006.01)
*G06F 8/41* (2018.01)
*G06F 8/10* (2018.01)

(52) U.S. Cl.
CPC ............ *G06F 11/3688* (2013.01); *G06F 8/10* (2013.01); *G06F 8/433* (2013.01); *G06F 11/3664* (2013.01)

(58) Field of Classification Search
CPC ........ G06F 11/03; G06F 11/3688; G06F 8/10; G06F 8/433; G06F 11/3664
USPC .................................................. 717/121–124
See application file for complete search history.

(56) References Cited

U.S. PATENT DOCUMENTS 6,698,013 B1 2/2004 Bertero et al.
8,037,453 B1 * 10/2011 Zawadzki ................ G06F 8/71 717/123
8,977,610 B2 3/2015 Bhattacharjee et al.
9,141,545 B2 9/2015 Sonwane et al.
9,384,575 B2 7/2016 Armitage
9,430,558 B2 8/2016 Bhat et al.
9,817,841 B2 11/2017 Mavinakuli et al.
9,983,985 B2 5/2018 Rai et al.
10,025,817 B2 7/2018 Mavinakuli et al.
2006/0130040 A1 * 6/2006 Subramanian ............ G06F 8/65 717/168
2008/0154737 A1 6/2008 Linkswiler
2009/0222365 A1 9/2009 McGlynn et al.
2010/0100470 A1 4/2010 Buchanan et al.
2010/0153238 A1 6/2010 Zaghloul
2011/0029853 A1 2/2011 Garrity et al.
2011/0066493 A1 3/2011 Faith et al.
2013/0046766 A1 2/2013 Shishido et al.

(Continued)

OTHER PUBLICATIONS

U.S. Appl. No. 16/050,885, filed Jul. 31, 2018, Nagaraja, et al.

*Primary Examiner* — Daxin Wu
(74) *Attorney, Agent, or Firm* — Fish & Richardson P.C.

(57) ABSTRACT

Methods, systems, and computer-readable storage media for receiving, by an IRFT, a commit, the commit including one or more code changes to the project, in response to receiving the commit, providing, by the IRFT, a dependency map, the dependency map defining dependencies between the project and one or more of one or more other projects, one or more packages, and one or more bundles, generating, by the IRFT, a project test set based on the dependency map, the project test set including one or more projects each having one or more features to be regression tested, and initiating, by the IRFT, execution of regression testing of features of projects included in the project test set, wherein regression testing comprises executing a sub-set of test cases based on priority.

20 Claims, 6 Drawing Sheets

(56) References Cited

U.S. PATENT DOCUMENTS

2013/0232469 A1* 9/2013 Agarwal .................. G06F 8/71 717/121
2014/0157170 A1 6/2014 Elias
2014/0173634 A1* 6/2014 Shanmugasundaram .................... G06F 9/465 719/316
2014/0253455 A1 9/2014 Mauro et al.
2015/0033212 A1* 1/2015 Mizobuchi .......... G06F 11/3688 717/131
2015/0293948 A1 10/2015 Sonwane et al.
2015/0370616 A1 12/2015 Peterson et al.
2015/0370888 A1 12/2015 Fonseca E Costa et al.
2016/0124909 A1 5/2016 Basson et al.
2017/0039193 A1 2/2017 Mustafi et al.

* cited by examiner

410

| Analytic Doc | Table | Chart | Input Control | Drill | REL |
|---|---|---|---|---|---|
| Table | D | | D | I | I |
| Chart | | D | I | D | D |
| Input Control | D | D | | I | I |
| Drill | I | I | I | D | D |
| REL | I | I | I | I | D |
| Geomap | I | I | | | |
| Hierarchy Table | D | | D | I | I |
| Hierarchy chart | | D | I | D | D |
| Prompt | I | I | | | |

INTELLIGENT REGRESSION FORTIFIER

BACKGROUND

In software development, software configuration management (SCM) includes activities for tracking and controlling changes in software code during the development process. Software configuration (SC) can generally refer to all items that are part of a software development project. Example items can include, without limitation, programs, data, documents (e.g., requirements, test cases). During the software development process, items often change (e.g., are created, edited, deleted), and changes need to be controlled. Accordingly, SCM tools are available to assist with tracking, and controlling changes. The term SCM has been defined as the process of identifying and defining items in the system, controlling changes of items throughout their life cycle, recording and reporting the status of items and change requests, and verifying the completeness and correctness of items.

In some instances, such as large software projects, developers can submit code changes to a SCM tool, which checks code changes before committal and merging. For example, a so-called Jenkins voter job can be triggered, which only enables committal of code changes, if both the change that is to be committed and the overall project code in the SCM passes a set of tests. If the tests are passed (e.g., the build is green), then the voter will vote the commit as verified.

Compiling and testing the overall code is often time consuming, and during critical phases, very demanding and very slow. Doing this for every code change is mandatory where developers often wait to merge the change. Further, this does not guarantee that the code change to be regression free. Regression generally refers to software performance degrading (e.g., executes more slowly, uses more memory) after one or more changes. It can be difficult to find regressions as it is often manually performed, and usually identified only after the regression-causing code change is merged. Regression testing is time and resource consuming, and is only periodically performed (e.g., towards the end of the development, or sprint cycle).

SUMMARY

Implementations of the present disclosure are directed to regression testing in software configuration management (SCM). More particularly, implementations of the present disclosure are directed to an Intelligent Regression Fortifier Tool (IRFT) for efficient regression testing in SCM.

In some implementations, actions include receiving, by an IRFT, a commit, the commit including one or more code changes to the project, in response to receiving the commit, providing, by the IRFT, a dependency map, the dependency map defining dependencies between the project and one or more of one or more other projects, one or more packages, and one or more bundles, generating, by the IRFT, a project test set based on the dependency map, the project test set including one or more projects each having one or more features to be regression tested, and initiating, by the IRFT, execution of regression testing of features of projects included in the project test set, wherein regression testing comprises executing a sub-set of test cases based on priority. Other implementations of this aspect include corresponding systems, apparatus, and computer programs, configured to perform the actions of the methods, encoded on computer storage devices.

These and other implementations can each optionally include one or more of the following features: providing a dependency map includes determining dependencies based on all manifest files within the project; one or more of dependent projects and dependent bundles are determined from a Require-Bundle entry of a manifest, one or more dependent projects are determined from a Bundle-ClassPath entry of a manifest, and one or more dependent packages are determined from an Import-Packages entry of a manifest; dependencies between the project and one or more of one or more other projects, one or more packages, and one or more bundles are determined based on matching to one or more of a key and a value of the dependency map; the one or more features are provided in a feature test set that includes all features of projects in the project test set; the one or more features are provided in a feature test set that includes a sub-set of features of projects in the project test set based on one or more impact types; and the one or more impact types include indirect impact, and direct impact.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
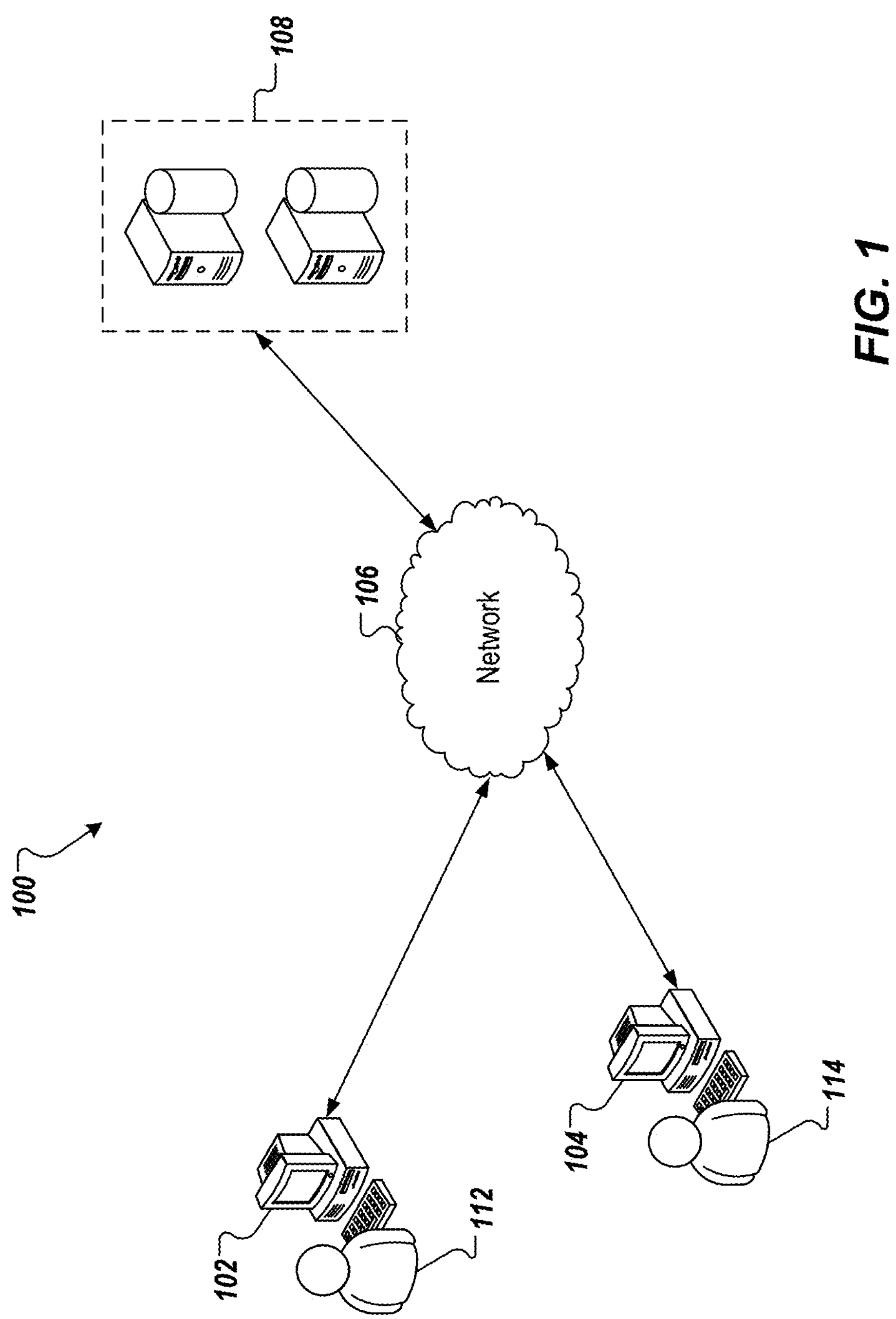
FIG. 1 depicts an example architecture that can be used to execute implementations of the present disclosure.

Implementations of the present disclosure are directed to regression testing in software configuration management (SCM). More particularly, implementations of the present disclosure are directed to an Intelligent Regression Fortifier Tool (IRFT) for efficient regression testing in SCM. Implementations can include actions of receiving, by an IRFT, a commit, the commit including one or more code changes to the project, in response to receiving the commit, providing, by the IRFT, a dependency map, the dependency map defining dependencies between the project and one or more of one or more other projects, one or more packages, and one or more bundles, generating, by the IRFT, a project test set based on the dependency map, the project test set including one or more projects each having one or more features to be regression tested, and initiating, by the IRFT, execution of regression testing of features of projects included in the project test set, wherein regression testing comprises executing a sub-set of test cases based on priority.

To provide further context for implementations of the present disclosure, and as introduced above, developers can submit code changes to a software configuration management (SCM) tool, which checks code changes before committal and merging. For example, a so-called Jenkins voter job can be triggered, which only enables committal of code changes, if both the change that is to be committed and the overall project code in the SCM passes a set of tests. If the tests are passed (e.g., the build is green), then the voter will vote the commit as verified.

Compiling and testing the overall code is often time consuming, and during critical phases, very demanding and very slow. Doing this for every code change is mandatory where developers often wait to merge the change. Further, this does not guarantee that the code change to be regression free. Regression generally refers to software performance degrading (e.g., executes more slowly, uses more memory) after one or more changes. It can be difficult to find regressions as it is often manually performed, and usually identified only after the regression-causing code change is merged. Regression testing is time and resource consuming, and is only periodically performed (e.g., towards the end of the development, or sprint cycle).

In some examples, when a code change occurs, it is possible to identify the projects where the code change has occurred. It is not good to compile, and test only these projects, however, as there could be dependent projects. In cases of dependent projects, it is necessary to test both the project, and any dependent projects against the code change. Because of this, the Jenkins voter job, for example, is configured to compile, and test all of the projects. This provides surety at the cost of time and resources.

If a regression is identified (e.g., through testing), narrowing down to the code change that caused the regression is time consuming, and resource-intensive. For example, if a regression is discovered through regression testing, a bug is raised. After raising the bug, it is the developer's job to identify the commit (code change), which could have caused the regression. In many cases, there can be such a numerosity of commits, finding the commit that was at fault takes significant time, and resources. Once the commit is found, the issue is assigned to the owner of the commit for resolution.

In view of the above context, implementations of the present disclosure provide an IRFT that enables focused regression testing. More particularly, and as described in further detail herein, the IRFT enables accurate identification of affected modules, which can be compiled for regression testing. That is, the IRFT of the present disclosure enables more efficient use of resources during software development processes, by compiling and testing only affected modules. Further, the IRFT triggers regression testing on code check-in, and only on affected projects, and their dependent projects.

FIG. 1 depicts an example architecture 100 in accordance with implementations of the present disclosure. In the depicted example, the example architecture 100 includes one or more client devices 102, 104, a network 106, and a server system 108. The server system 108 includes one or more server devices and databases (e.g., processors, memory). In the depicted example, respective users 112, 114 interact with the client devices 102, 104. In an example context, the users 112, 114 can include software developers, who interact with a SCM tool hosted by the server system 108 to develop software projects (also referred to herein as projects).

In some examples, the client devices 102, 104 can communicate with the server system 108 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client devices 102, 104 over the network 106).

In accordance with implementations of the present disclosure, and as noted above, the server system 108 can host an IRFT for efficient regression testing in response to code changes. In some examples, and as described in further detail herein, the IRFT identifies, and initiates execution of regression testing on select software components in response to code changes. In some examples, the IRFT is a standalone tool that is independent from the SCM tool. In some examples, the IRFT is incorporated into the SCM tool.

As introduced above, implementations of the present disclosure are directed to an IRFT that enables focused regression testing. More particularly, and as described in further detail herein, the IRFT enables accurate identification of affected modules, which can be compiled for regression testing. The IRFT of the present disclosure is an intelligent system that performs effective and efficient regression testing for changes pushed to production. In this manner, the IRFT enables regression issues to be timely, and resource-efficiently addressed without compromising on the product quality.

In some implementations, the IRFT is independent of a SCM tool. In some examples, attempted commitment of code changes results in the code changes being provided to the IRFT (e.g., from the SCM tool to the IRFT), and results of any triggered regression tests are provided to the SCM tool. In some examples, and as described herein, positive results can enable (automatic) committal of the respective code changes by the SCM tool. In some implementations, the IRFT is integrated within the SCM tool, and performs operations described herein.

In further detail, the IFRT receives code changes, and determined the project (e.g., stored in archive files, such as Java archive (JAR) filed) that are dependent on the projects where the code changes occurred. In some examples, from the commit (code change), the package names and the project name are determined from every file (e.g., Java file), and a dependency map is created. In some examples, the dependency map maps the project, within which the code change(s) occurred to other projects that may be affected by the project.

Figure 2:
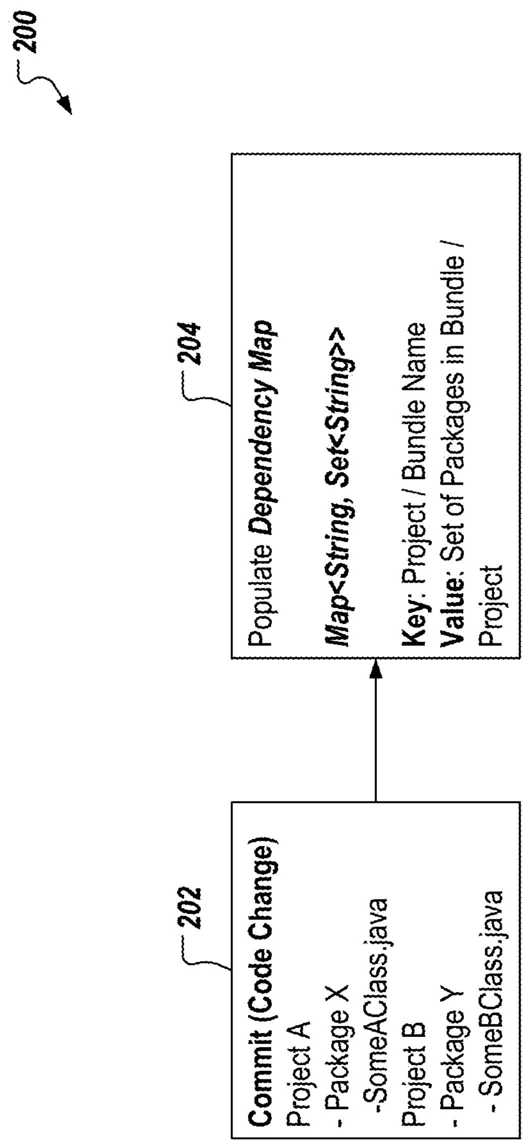
FIG. 2 depicts an example dependency map in accordance with implementations of the present disclosure.

FIG. 2 depicts an example dependency map creation 200 in accordance with implementations of the present disclosure. In depicted example, the example dependency map creation 200 includes an example commit (code changes) 202, and an example dependency map population 204. The example commit 202 includes respective code changes to a Project A, and a Project B. With respect to the Project A, a code change is to a Package X within the Project A, and a class within the Package X (e.g., SomeAClass.java). With respect to the Project B, a code change is to a Package Y within the Project B, and a class within the Package Y (e.g., SomeBClass.java).

In some implementations, a structure of the dependency map can include:

KEY_1→VALUE_1,
KEY_2→VALUE_2,
. . . ,
KEY_N→VALUE_N

For example:

"SAMPLE_PROJECT_1"→["SAMPLE_PACKAGE_A", "SAMPLE_PACKAGE_B"],
"SAMPLE_PROJECT_2"→["SAMPLE_PACKAGE_X"]

In the case of the example commit code 202, the commit has files modified in Project A-Package X and Project B-Package Y. Accordingly, an example dependency map can be provided as:

"Project A"→["Package X"],
"Project B"→["Package Y"]

In some implementations, the manifest file (e.g., MANIFEST.MF) of all of the projects (e.g., JAR files) is read. In some examples, the manifest file contains information (metadata) about the files packaged in a project (e.g., JAR file). The manifest is read to identify particular entries. Example entries include, without limitation, Import-Package, Require-Bundle, and Bundle-ClassPath. Import-Package is a header that declares external dependencies of the particular project. Require-Bundle is a header used to express a bundle's explicit dependency upon other bundles by specifying a list of bundle symbolic names. A bundle that uses this header automatically has access to the packages exported by its required bundles. Bundle-ClassPath is an ordered, comma-separated list of relative bundle JAR file locations to be searched for class and resource requests. In some examples, a bundle can be described as an archive file (e.g., JAR file) that contain resources and classes for providing a set of functionality. Bundles differ from standard project files in that they must contain a manifest describing the bundle and its dependencies. In some examples, bundles use the JAR file manifest format composed of name-value pairs.

In some examples, it is determined whether any package entry matches packages of the projects where code changes have occurred (e.g., projects identified in the commit). In some examples, it is determined whether any bundle entry matches with the names of the projects where the code change has occurred. In some examples, it is determined whether any archive file names in the class path entry matches with the names of the projects where the code change has occurred. In accordance with implementations of the present disclosure, any matches are added to a project test set, which identifies a set of projects for potential regression testing.

Figure 3:
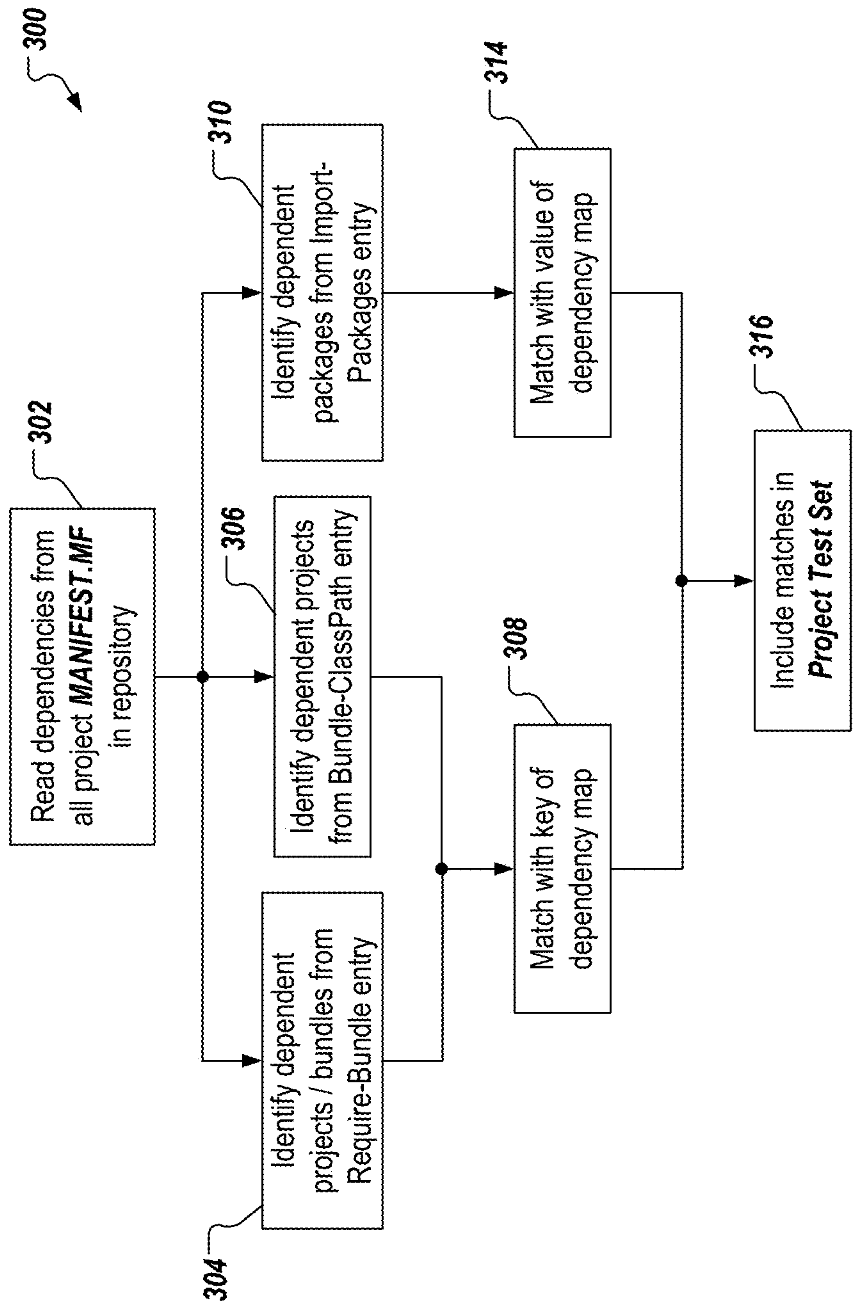
FIG. 3 depicts an example project test set creation in accordance with implementations of the present disclosure.

FIG. 3 depicts an example project test set creation 300 in accordance with implementations of the present disclosure. In the depicted example, dependencies are read from the manifest files of all projects within the repository (302). For example, the development environment can include a repository storing all projects (e.g., JAR files), and their respective manifest files. In response to a code change to a particular project, the manifest files of all projects are read to identify any dependencies between the particular project, and other projects in the repository.

For example, any projects/bundles in the Require-Bundle entry of each manifest are identified to provide a set of dependent bundles (304). Any projects from the Bundle-ClassPath entry of each manifest are identified to provide a set of dependent projects (306). Each bundle in the set of dependent bundles, and each project in the set of dependent projects is compared to the key of the dependency map (e.g., the dependency map of FIG. 2) to identify any matches (308). Any matching bundles are included in the project test set (316).

As another example, any packages in the Import-Packages entry of each manifest are identified, and are included in a set of dependent packages (310). Each package in the set of dependent packages is compared to the key of the dependency map (e.g., the dependency map of FIG. 2) to identify any matches (310). Any matching packages are included in the project test set (316).

In some examples, projects can be distinguished between backend projects, and frontend projects. In some examples, a backend project includes software development for software (application) executing on a server (e.g., a web server that hosts the application, which communicates with a database to serve data presented on a frontend). In some examples, a frontend project includes software development for software (application) executing on a client device to present data to users. In some examples, for backend projects, instead of testing all of the projects, only the projects in the project test set will be tested. In some examples, for frontend projects, the dependent project list will already be maintained by the developers for all of the projects in their respective properties file. Based on the code change, the projects where the code change occurred, and the dependent projects of those projects are identified, and testing is performed on the relevant projects.

In some implementations, projects included in the set of projects are compiled, and unit tests are performed. More particularly, the IRFT performs unit tests to identify the features, which could be impacted. Regression testing is performed on these features. That is, a feature test set is provided, and the regression testing is performed on features in the feature test set. In some examples, features are identified automatically by the IRFT tool. In some examples, features are identified manually. In some examples, features are identified in a hybrid of automatically, and manually.

Figures 4A, 4B:
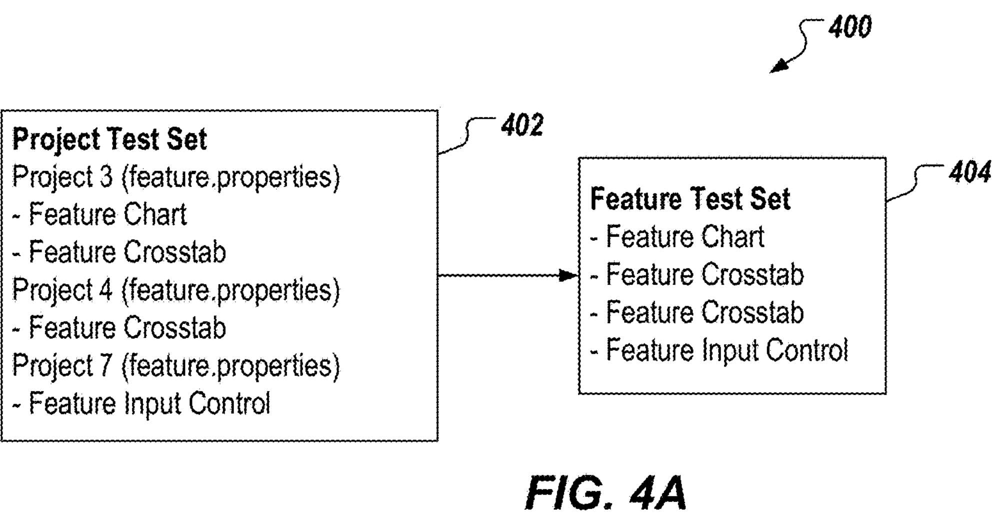
FIG. 4A depicts an example provision of a feature test set in accordance with implementations of the present disclosure.
FIG. 4B depicts an example feature impact matrix in accordance with implementations of the present disclosure.

FIG. 4A depicts an example automatic provision of a feature test set in accordance with implementations of the present disclosure. The example of FIG. 4A reflects automatic identification of features to be tested, and included in the set of features. In the example of FIG. 4A, a project test set 402 includes a Project 3, a Project 4, and a Project 7. A feature test set 404 is automatically created, and includes the features of the respective projects in the project test set 402. Example features include, without limitation, chart, cross tabulation (crosstab), input control, drill, and rel. It is contemplated, however, that features can include any appropriate features provided by the applications. In some examples, the feature test set 404 is automatically created by identifying features in the project test set (e.g., based on features.properties of the respective projects), and adding the identified features to the feature test set 404.

FIG. 4B depicts an example feature impact matrix 410 in accordance with implementations of the present disclosure. In some examples, the feature impact matrix is manually created in collaboration with stakeholders (e.g., Product Architects, Developers, Quality Experts, Product Experts). In the example of FIG. 4B, D represents 'Direct Impact' for which all test cases (Priority 1, 2, 3, 4) are executed for respective features, I represents 'Indirect Impact' for which only Priority 1 test cases would be executed. In some examples, the feature impact matrix 410 is used to identify features having Direct Impact and Indirect Impact for regression testing, and are included in a feature test set.

In a hybrid approach, features automatically identified, and manually identified are combined into a single feature test set.

In some implementations, the IRFT retrieves a test suite, and test files for respective testing frameworks for testing of features in the feature test set from a repository. In some implementations, the IRFT initiates automated regression tests based on the test suite, and test files. For example, the IRFT can provide respective requests to the testing frameworks including test files for the test frameworks to execute. In some examples, each test case in the test suite follows a naming convention. An example naming convention includes, without limitation, <Tool>_<Feature name>_<Workflow>_<Priority>. In this example, tool references the test case tool that is been used (e.g., Selenium, Silk), feature name references the feature that is undergoing regression testing, workflow references the workflow within the feature that is impacted due to the code change, and priority references the priority of the feature as defined by the tester. Example test cases can include, without limitation, Selenium_Table_SortAsc_Prio1, and Silk_Filter_SingleVal_Prio2. The regression tests are executed, and test results are reported.

In some implementations, the test results are provided in a display (e.g., a dashboard, an email). In some examples, the test results are displayed for a particular change list that prompted the regression testing (e.g., change list 421301). In some examples, the test results provide information on the number of test cases executed, the number of passes, and fails, if any, and/or statistics (e.g., percentages of passes vs. fails). For example, the test results can include a table that summarizes the number of test cases run per testing tool, and the respective results. For example:

Example Test Results Table

| Tool | Test Cases | Pass | Fail |
|---|---|---|---|
| Junit | 28 | 27 | 1 |
| Selenium | 18 | 18 | 0 |
| Silk | 9 | 9 | 0 |
| Total | 55 | 54 | 1 |

In some examples, a list of passed test cases, and a list of failed test cases are provided.

Figure 5:
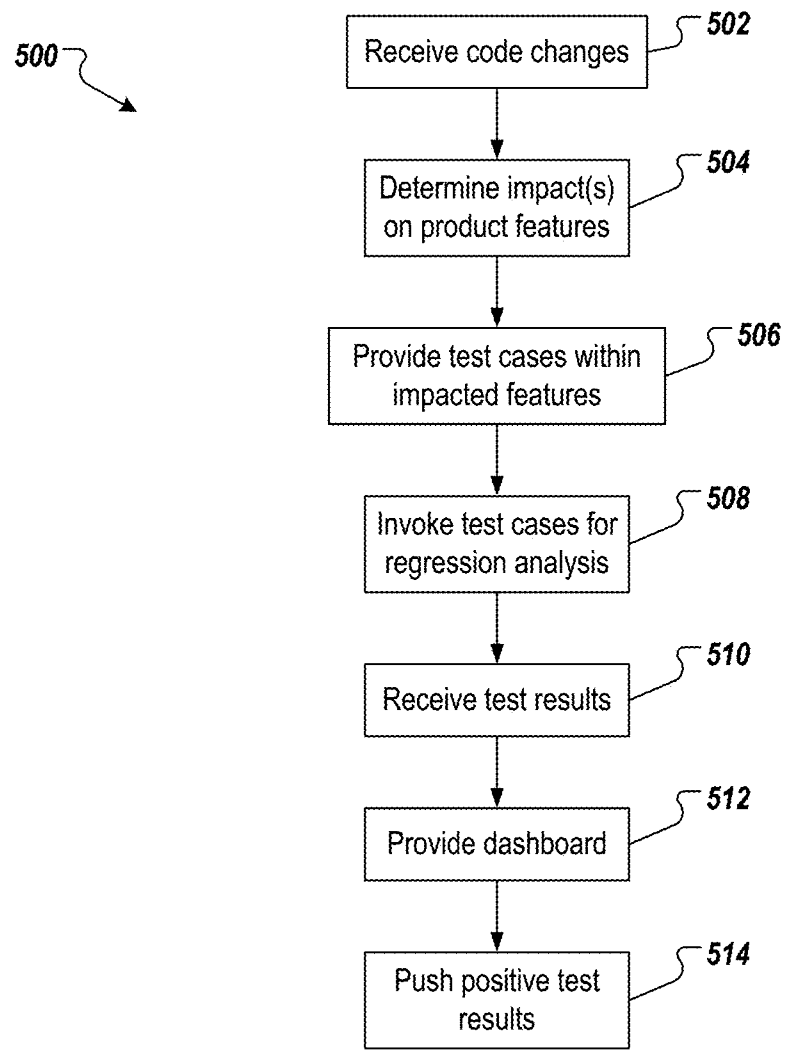
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices. For example, at least a portion of the example process 500 can be executed by an IRFT of the present disclosure.

Code changes are received (502). For example, a change list is submitted to an SCM tool, the change list including one or more code changes to software of a project. Impacts on product features are determined (504). For example, and as described herein, the IRFT of the present disclosure reads all manifest files of the project to identify dependencies between the project, and any other projects, bundles, and/or packages. More specifically, and as described above, a dependency map is generated from the manifest(s), and includes a key and value. In some examples, projects, and/or bundles are matched for inclusion in a project test set based on the key, and packages are matched for inclusion in the project test set based on the value.

Test cases are provided for impacted features (506). For example, and as described herein, the IRFT determines a feature test set including features of projects included in the project test set. In some examples, one or more test cases are defined (e.g., pre-defined and stored in a repository) for each feature, and can be selected for use in regression testing of respective features. In some examples, a feature can be associated with an impact type (e.g., direct, indirect), and test cases can be associated with respective priorities. In some examples, for features designated as direct impact, test cases of all priorities are used for regression testing (e.g., priorities 1, 2, 3, 4). In some examples, for features designated as indirect impact, only test cases of one or more priorities are used for regression testing (e.g., priority 1).

Test cases are invoked for regression testing (508). For example, the IRFT initiates automated regression tests based on the test suite, and test files. For example, the IRFT can provide respective requests to the testing frameworks including test files for the test frameworks to execute. Test results are received (510). For example, the test results are received by the IRFT from respective testing tools. A dashboard displaying the test results is provided (512). Code changes associated with positive test results are automatically pushed (514). For example, code changes that pass the regression testing can be automatically merged with code maintained by the SCM tool.

Figure 6:
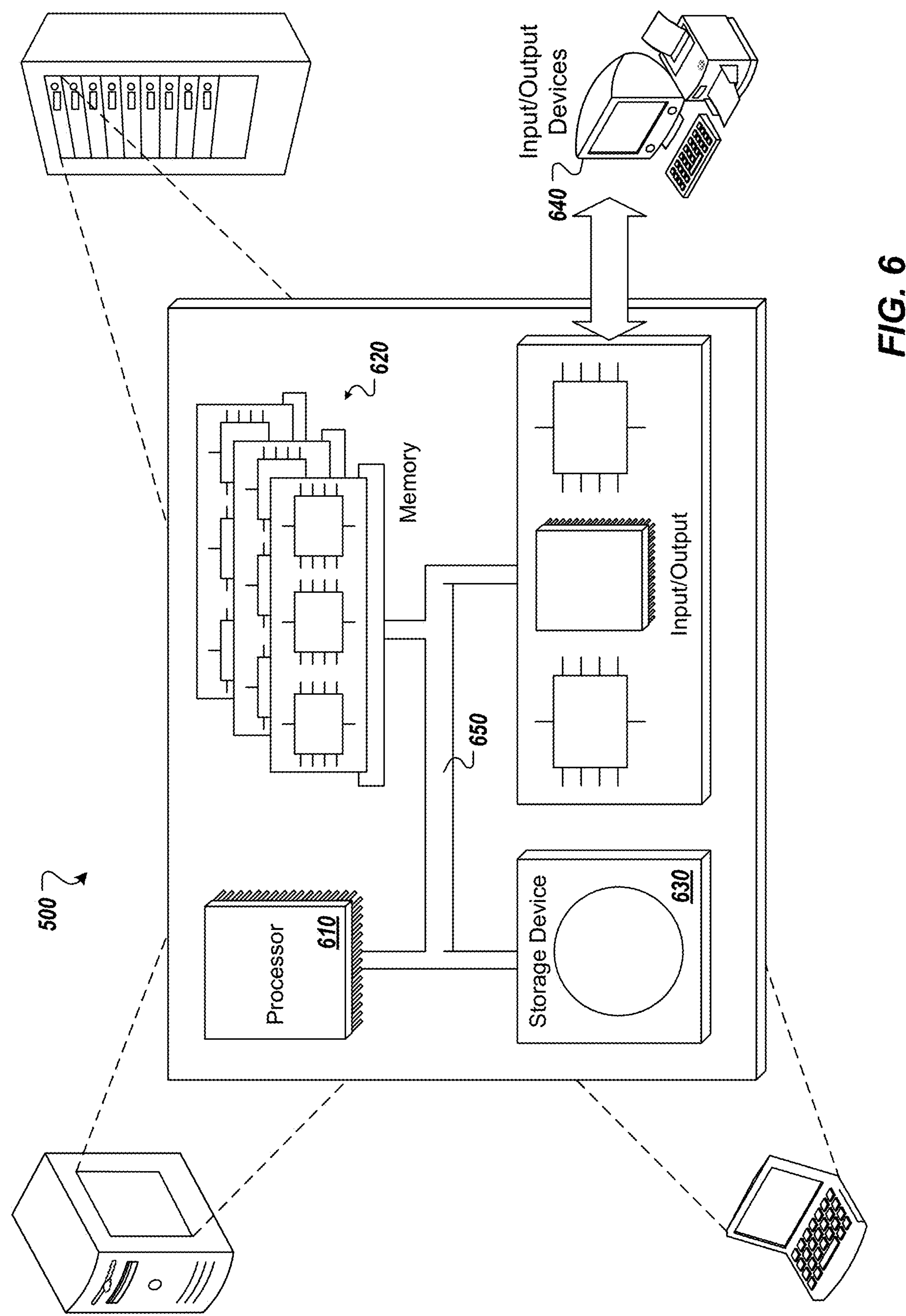
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selective regression testing in response to one or more code changes to a project comprising software code, the method being executed by one or more processors and comprising:

- receiving, by an intelligent regression fortifier tool (IRFT), a commit comprising, for each project in a set of projects, one or more files with code changes to the project, the commit being received from a software configuration management (SCM) tool and indicating a commitment of the code changes;
- in response to receiving the commit, creating, by the IRFT, a dependency map based on the commit, the dependency map defining dependencies between each project in the set of projects with one or more files with code changes and one or more of one or more other projects, one or more packages, and one or more bundles;
- determining, by the IRFT, one or more features of projects impacted by the code changes based on the dependency map;
- generating, by the IRFT, a project test set based on the dependency map, the project test set comprising one or more projects each having one or more impacted features to be regression tested; and
- initiating, by the IRFT, execution of regression testing of impacted features of projects included in the project test set, wherein regression testing comprises executing a sub-set of test cases based on priority.

2. The method of claim 1, wherein providing a dependency map comprises determining dependencies based on all manifest files within the project.

3. The method of claim 2, wherein one or more of dependent projects and dependent bundles are determined from a Require-Bundle entry of a manifest, one or more dependent projects are determined from a Bundle-ClassPath entry of a manifest, and one or more dependent packages are determined from an Import-Packages entry of a manifest.

4. The method of claim 2, wherein dependencies between the project and one or more of one or more other projects, one or more packages, and one or more bundles are determined based on matching to one or more of a key and a value of the dependency map.

5. The method of claim 1, wherein the one or more features are provided in a feature test set that includes all features of projects in the project test set.

6. The method of claim 1, wherein the one or more features are provided in a feature test set that includes a sub-set of features of projects in the project test set based on one or more impact types.

7. The method of claim 6, wherein the one or more impact types include indirect impact, and direct impact.

8. A non-transitory computer-readable storage medium coupled to one or more processors and having instructions stored thereon which, when executed by the one or more processors, cause the one or more processors to perform operations for selective regression testing in response to one or more code changes to a project comprising software code, the operations comprising:

receiving, by an intelligent regression fortifier tool (IRFT), a commit comprising, for each project in a set of projects, one or more files with code changes to the project, the commit being received from a software configuration management (SCM) tool and indicating a commitment of the code changes;

in response to receiving the commit, creating, by the IRFT, a dependency map based on the commit, the dependency map defining dependencies between each project in the set of projects with one or more files with code changes and one or more of one or more other projects, one or more packages, and one or more bundles;

determining, by the IRFT, one or more features of the projects impacted by the code changes based on the dependency map;

generating, by the IRFT, a project test set based on the dependency map, the project test set comprising one or more projects each having one or more impacted features to be regression tested; and initiating, by the IRFT, execution of regression testing of impacted features of projects included in the project test set, wherein regression testing comprises executing a sub-set of test cases based on priority.

9. The computer-readable storage medium of claim 8, wherein providing a dependency map comprises determining dependencies based on all manifest files within the project.

10. The computer-readable storage medium of claim 9, wherein one or more of dependent projects and dependent bundles are determined from a Require-Bundle entry of a manifest, one or more dependent projects are determined from a Bundle-ClassPath entry of a manifest, and one or more dependent packages are determined from an Import-Packages entry of a manifest.

11. The computer-readable storage medium of claim 9, wherein dependencies between the project and one or more of one or more other projects, one or more packages, and one or more bundles are determined based on matching to one or more of a key and a value of the dependency map.

12. The computer-readable storage medium of claim 8, wherein the one or more features are provided in a feature test set that includes all features of projects in the project test set.

13. The computer-readable storage medium of claim 8, wherein the one or more features are provided in a feature test set that includes a sub-set of features of projects in the project test set based on one or more impact types.

14. The computer-readable storage medium of claim 13, wherein the one or more impact types include indirect impact, and direct impact.

15. A system, comprising:

a computing device; and a non-transitory computer-readable storage device coupled to the computing device and having instructions stored thereon which, when executed by the computing device, cause the computing device to perform operations for selective regression testing in response to one or more code changes to a project comprising software code, the operations comprising:

receiving, by an intelligent regression fortifier tool (IRFT), a commit comprising, for each project in a set of projects, one or more files with code changes to the project, the commit being received from a software configuration management (SCM) tool and indicating a commitment of the code changes;

in response to receiving the commit, creating, by the IRFT, a dependency map based on the commit, the dependency map defining dependencies between each project in the set of projects with one or more files with code changes and one or more of one or more other projects, one or more packages, and one or more bundles;

determining, by the IRFT, one or more features of the projects impacted by the code changes based on the dependency map;

generating, by the IRFT, a project test set based on the dependency map, the project test set comprising one or more projects each having one or more impacted features to be regression tested; and initiating, by the IRFT, execution of regression testing of impacted features of projects included in the project test set, wherein regression testing comprises executing a sub-set of test cases based on priority.

16. The system of claim 15, wherein providing a dependency map comprises determining dependencies based on all manifest files within the project.

17. The system of claim 16, wherein one or more of dependent projects and dependent bundles are determined from a Require-Bundle entry of a manifest, one or more dependent projects are determined from a Bundle-ClassPath entry of a manifest, and one or more dependent packages are determined from an Import-Packages entry of a manifest.

18. The system of claim 16, wherein dependencies between the project and one or more of one or more other projects, one or more packages, and one or more bundles are determined based on matching to one or more of a key and a value of the dependency map.

19. The system of claim 15, wherein the one or more features are provided in a feature test set that includes all features of projects in the project test set.

20. The system of claim 15, wherein the one or more features are provided in a feature test set that includes a sub-set of features of projects in the project test set based on one or more impact types.

* * * * *